United States Patent
Kawasaki et al.

[11] Patent Number: 5,341,188
[45] Date of Patent: Aug. 23, 1994

[54] METHOD OF MAKING LIGHT-TRAPPING MEMBERS FOR PHOTOGRAPHIC FILM CASSETTE

[75] Inventors: Hidetoshi Kawasaki; Kazunori Mizuno; Nobuo Sugiyama, all of Kanagawa, Japan

[73] Assignee: Fuji Photo Film Co., Ltd., Kanagawa, Japan

[21] Appl. No.: 50,567

[22] Filed: Apr. 21, 1993

[30] Foreign Application Priority Data

Apr. 21, 1992 [JP] Japan ................................ 4-101152

[51] Int. Cl.$^5$ ............... B29C 53/14; D04H 11/00; D06C 13/00; G03B 17/26
[52] U.S. Cl. ........................................ 354/277; 26/106; 28/159; 264/103; 425/322; 428/92; 242/71.1
[58] Field of Search ............... 354/275, 277; 242/71.1, 242/71.7, 71.8; 28/159, 162; 26/106; 264/103, 280; 425/319, 322; 428/92

[56] References Cited

U.S. PATENT DOCUMENTS

3,920,372  11/1975  Katagi .......................... 425/319 X
5,234,176  8/1993  Mizuno .......................... 242/71.1

FOREIGN PATENT DOCUMENTS

62-27733  2/1987  Japan .
62-55649  3/1987  Japan .
62-71949  4/1987  Japan .
63-49756  3/1988  Japan .
272348    3/1990  Japan .
422944    1/1992  Japan .

Primary Examiner—David M. Gray
Assistant Examiner—J. K. Han
Attorney, Agent, or Firm—Sughrue, Mion, Zinn, Macpeak & Seas

[57] ABSTRACT

Light-trapping members are cut out of a ribbon consisting of a base fabric and piles. The piles of the ribbon are pressed against the peripheral surface of a thermal drum to be inclined in the width direction after the ribbon is passed through and twisted by a twister disposed close to the thermal drum. The light-trapping members with inclined piles are attached to a film passage mouth of a self-advancing-type photographic film cassette with the inclination of the piles directed to the outside of the film passage mouth, so that the leading end of a photographic film can be advanced smoothly by rotation of a spool through the light-trapping members to the outside of the cassette.

16 Claims, 5 Drawing Sheets

METHOD OF MAKING LIGHT-TRAPPING MEMBERS FOR PHOTOGRAPHIC FILM CASSETTE

BACKGROUND OF THE INVENTION

1. Field of the Invention

The present invention relates to a method of making light-trapping members having inclined piles and more particularly to a method of making light-trapping members to be attached to a film passage mouth of a photographic film cassette in which a film leader is advanced out of the photographic film cassette through the film passage mouth.

2. Description of the Related Art

Recently, photographic film cassettes, in which an entire photographic film is wound on a spool and contained in a cassette shell in order to facilitate the loading of the photographic film cassette into a camera, have been utilized. The maximum diameter of the roll of photographic film is approximately equal to or smaller than the inside diameter of the cassette shell to prevent loosening of the roll of photographic film. In such a photographic film cassette, the leading end of the photographic film is advanced out of the cassette shell, through a film passage mouth, by rotating the spool in a film advancing direction.

In order to prevent external light from entering into the cassette shell through the film passage mouth, light-trapping members are attached to the upper and lower inside surfaces of the film passage mouth. When the leading end is advanced out of the cassette shell by rotation of the spool, a large advancing torque is required so as to prevent the leading end from being caught by the light-trapping members. Therefore, if conventional light-trapping members, such as plushes, are attached to the film passage mouth of the cassette shell, the leading end needs to pass through the film passage mouth while disentangling any entangled piles of the plushes, which causes the leading end to encounter a very large resistance due to interaction with the plushes.

Therefore, it is necessary to use light-trapping members having inclined piles in order to reduce the advancing torque. The piles need to be inclined from the roots thereof at a constant angle with respect to a base fabric of the light-trapping members. The piles in each row overlie the piles in an adjacent row. The light-trapping members are attached to the film passage mouth such that the inclination of the piles is directed toward the film advancing direction. As disclosed in Japanese Patent Laid-Open Publication No. 4-22944, piles can be raised by a brushing roller.

If a web is brushed to incline its piles and is slit thinly to obtain ribbons having the same width as the light-trapping members, tips of inclined piles are cut and a large amount of dust is thus generated. Accordingly, it is preferable to weave a ribbon having the same width as the light-trapping members or to slit a web into a number of ribbons prior to imparting inclination to their piles. The ribbons is cut by a length equal to the width of the film passage mouth. However, when inclining the piles of a thin ribbon with the brushing roller, the ribbon tends to be twisted due to its thinness, resulting in irregular inclinations of the piles.

SUMMARY OF THE INVENTION

It is an object of the present invention to provide a method for making light-trapping members capable of advancing the leading end of a photographic film with a small advancing torque.

It is another object of the present invention to provide a method for making light-trapping members capable of reliably inclining piles at a constant angle.

This and other objects of the present invention are achieved by bringing piles of the ribbon into contact with a thermal drum so as to incline the piles in width direction of the ribbon while twisting the ribbon. In order to prevent loosening or entanglement of the piles, the moisture content of the ribbon is 50 (w/w)% or more.

In a preferred embodiment, a twister having a rectangular passage formed therein in the ribbon feeding direction is utilized to twist the ribbon by threading it in the passage thereof. The inclination of the piles can be varied by changing the inclination of the rectangular passage with respect to the ribbon width direction.

According to the present invention, it is possible to impart inclination to the piles of the ribbon uniformly, securely, and efficiently with a simple device.

BRIEF DESCRIPTION OF THE DRAWINGS

The above and other objects and advantages of the present invention will become apparent from the following detailed description of the preferred embodiments when read in connection with the following drawings, in which.

DETAILED DESCRIPTION OF THE INVENTION

Figure 1:
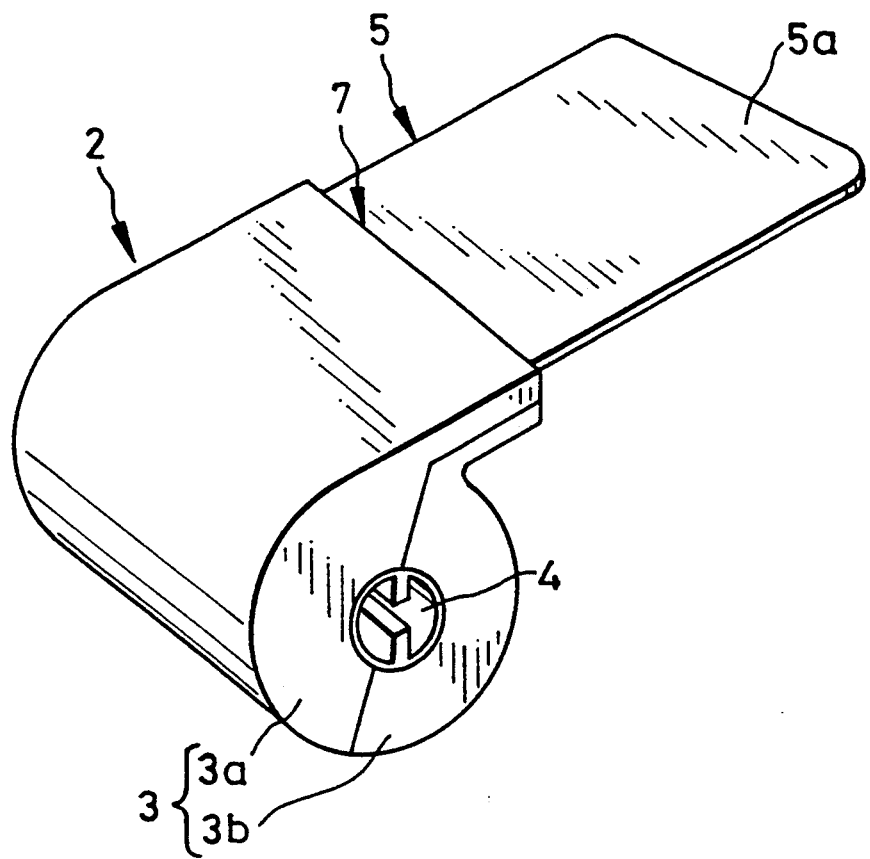
FIG. 1 is a perspective view of a photographic film cassette in which the leading end of a photographic film is advanced out of a cassette shell.
Figure 2:
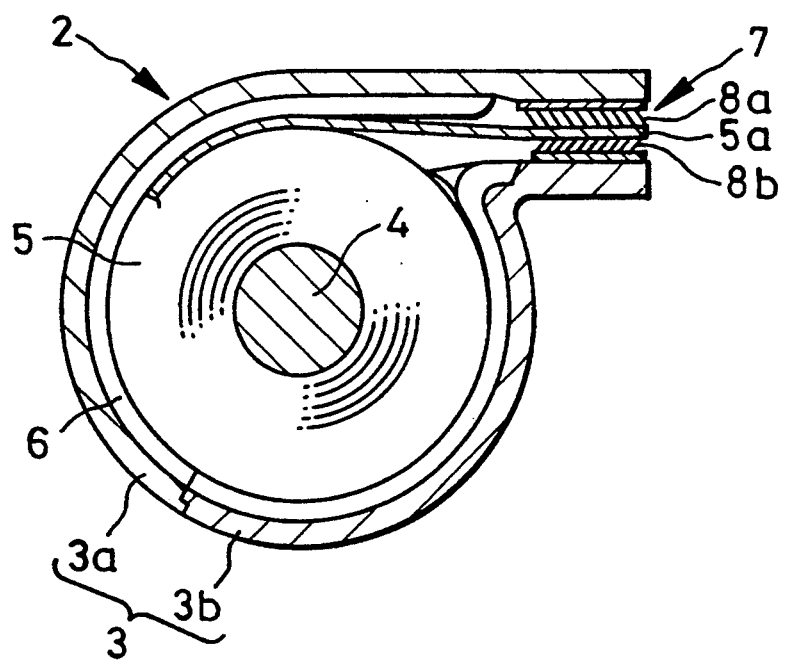
FIG. 2 is a cross section of the photographic film cassette of FIG. 1.

Referring to FIGS. 1 and 2, a photographic film cassette 2 has a cassette shell 3 which rotatably supports a spool 4, having a roll of photographic film 5 thereon. The entire photographic film 5 is initially contained in the cassette shell 3. The cassette shell 3 consists of two shell halves 3a and 3b and is provided on an inside surface with ridges 6, which are 0.5 mm wide and 0.6 mm high, to prevent the roll of photographic film 5 from loosening. In the alternative, the roll of photographic film 5 may be clamped by a pair of flanges of the spool 4. A leading end 5a of the photographic film 5 is advanced through a film passage mouth 7, which is 2.0 mm in height, by rotation of a spool 4. Black light-trapping members 8a and 8b are attached to the upper and lower inside surfaces of the film passage mouth 7 by an adhesive.

Figure 3:
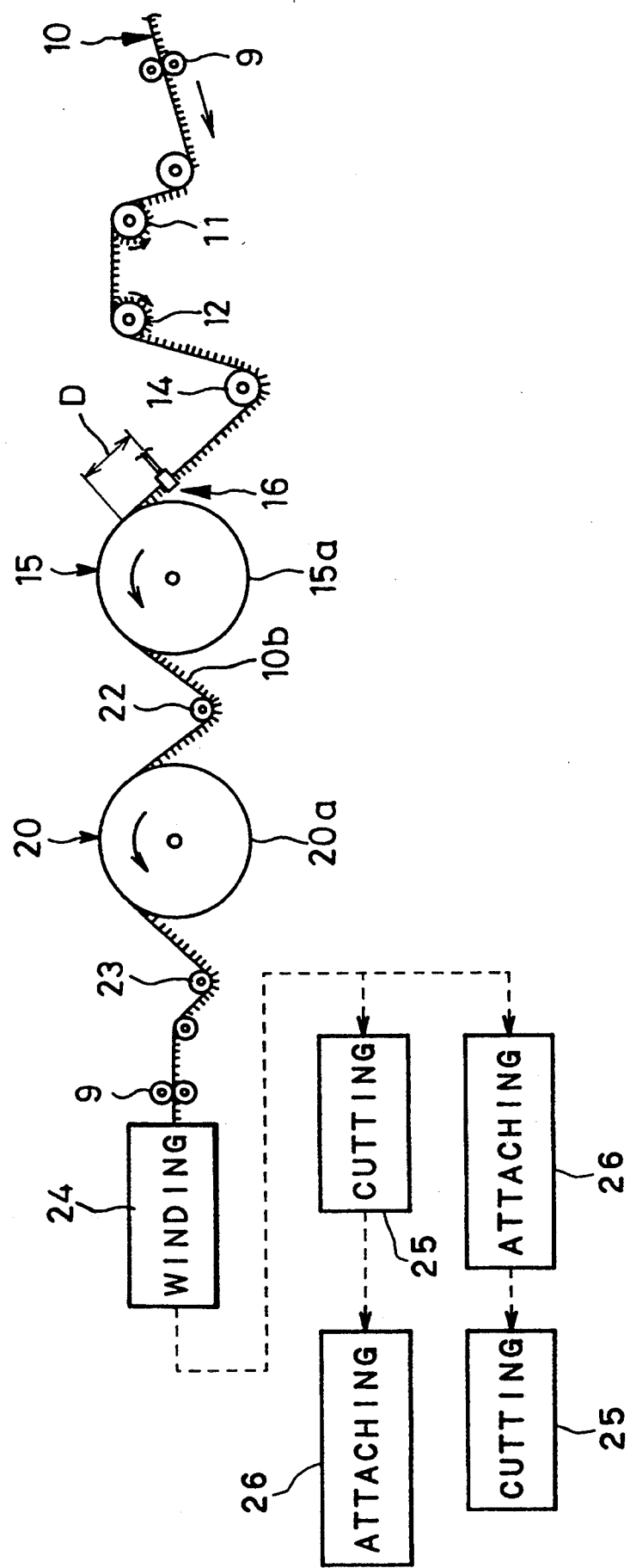
FIG. 3 is a schematic diagram illustrating a process for inclining piles of a ribbon according to the present invention.

Referring to FIG. 3, a process for making the light-trapping members from a ribbon 10 will be described. The ribbon 10 consists of a base fabric 10a and piles 10b and is formed by slitting a web (see FIG. 4). The ribbon 10 is first advanced by feed rollers 9 to raising rollers 11 and 12 where the piles 10b are raised in an erect manner. The raising rollers 11 and 12 have brushes disposed on their peripheries. The axes of the raising rollers 11 and 12 are parallel to the width direction of the ribbon 10. The raising roller 11 is rotated in the advancing direction of the ribbon 10 while the raising roller 12 is rotated in the opposite direction. Thereby, the piles 10b are efficiently raised. Of course, one of the raising rollers 11 and 12 may be omitted.

Figure 4:
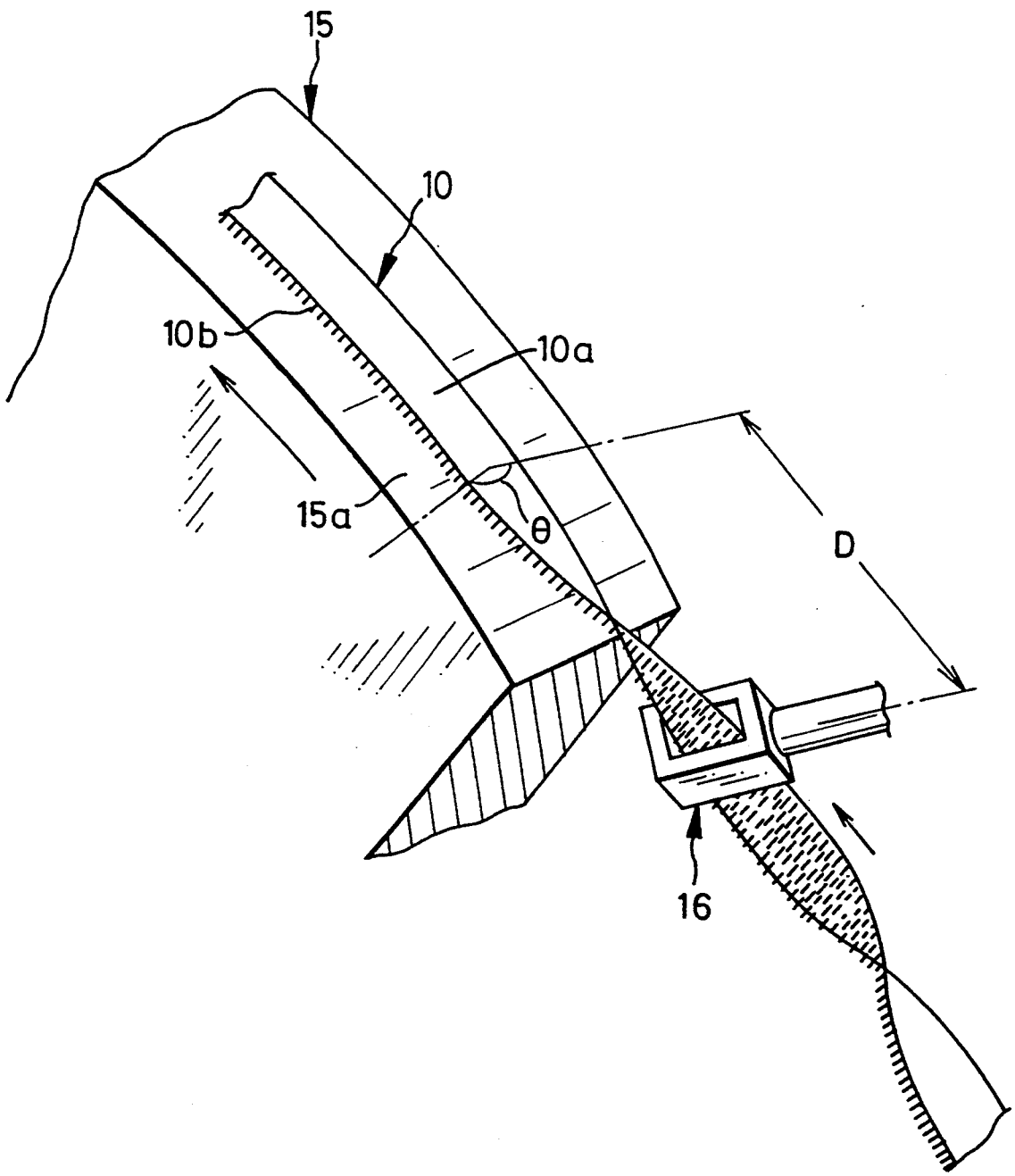
FIG. 4 is an explanatory diagram illustrating a relationship between the ribbon, a twister and a thermal drum as illustrated in FIG. 3.

The ribbon 10, having passed the raising rollers 11 and 12, is advanced via a guide roller 14 toward a thermal drum 15. As illustrated in FIG. 4, a twister 16 is provided at a distance D from a contact point between the ribbon 10 and a peripheral surface 15a of a thermal drum 15 so as to twist the ribbon 10. The distance D is preferably within 10 cm. It is possible to vary a contact angle between the piles 10b of the ribbon 10 and the peripheral surface 15a of the thermal drum 15 in the width direction of the ribbon 10 by altering a twisting angle Θ formed between the surface of the ribbon 10 on the thermal drum and the twister 16. In order to incline the piles 10b in the width direction of the ribbon 10 by contact with the thermal drum 15, the peripheral speed of the thermal drum 15 is adjusted to correspond to the advancing speed of the ribbon 10. In case of inclining the piles 10b of the ribbon 10 in the longitudinal direction, the peripheral speed of the thermal drum 15 can be adjusted to be different from the advancing speed of the ribbon 10 to a proper degree. The twist of the ribbon 10 is thus gradually released while the ribbon 10 is in contact with a surface of the thermal drum 15.

After having been substantially inclined by the thermal drum 15, the piles 10b of the ribbon 10 are pressed against a peripheral surface 20a of a thermal drum 20. Thereby, the ribbon 10 is dried and the inclination of the piles 10b is made steady. Tension rollers 22 and 23 are adapted to regulate tension of the ribbon 10 so as to properly set the pressing force of the ribbon 10 against the peripheral surfaces 15a and 20a of the thermal drums 15 and 20. The advancing speed of the ribbon 10 is, e.g., 8 m/min. The thermal drum 20 can be rotated at the same speed as the thermal drum 15.

After imparting the inclination to the piles 10b of the ribbon 10, the ribbon 10 is rolled in a winding process 24. The roll of ribbon 10 is transported to a cassette assembling line. In a cutting process 25 of the cassette assembling line, the ribbon 10 is cut to obtain the light-trapping members 8a and 8b the width of which is approximately equal to that of the film passage mouth 7. In an attaching process 26, the light-trapping members 8a and 8b are attached to the shell halves 3a and 3b with the inclination of the piles 10b directed in the film advancing direction. After anchoring the trailing end of the photographic film 5 to the spool 4, the shell halves 3a and 3b are mated so as to contain the spool 4 with the trailing end of the photographic film 5 anchored thereto and are attached by ultrasonic welding. Finally, the spool 4 is rotated to wind the photographic film 5 completely within the cassette shell 3.

After attaching the ribbon 10 on the shell halves 3a and 3b in the attaching process 26, the ribbon 10 may be cut to form the light-trapping members 8a and 8b in the cutting process 25. The winding process 24 may be omitted. The pile twisting process and the attaching process may be performed in a sequential manner. In the attaching process 26, the light-shielding members 8a and 8b may be attached to the shell halves 3a and 3b by ultrasonic welding or by an adhesive. The ribbon 10 may be initially woven in the width of 5 mm. However, the width of the ribbon 10 may be in a range of 2.0 mm to 10.0 mm.

For a base fabric 10a and the pile 10b of the ribbon 10, it is preferable to use synthetic fibers of thermoplastic resin, e.g. polyamide system such as nylon 6, nylon 66, or nylon 12, polyolefin system such as polyethylene, polypropylene, vinyl chloride or polystyrene, polyester system such polyethylene terephthalate or polybutylene phthalate, polyvinyl alcohol system, polyvinylidene chloride system, polyvinyl chloride system, polyacrylonitrile system, polyvinylidene cyanide system, polyfluoroethylene system, polyurethane system, etc. Although more than one thermoplastic resin selected from the above may be mixed, it is desirable to use thermoplastic resin suitable for making fibers.

As well known for destaticization, a static compound and/or a conductive substance should be applied to the thermoplastic resin by means of mixture, adsorption or coating. Also, the static compound may be copolymerized with the thermoplastic resin.

The static compound can be selected from alkyl ether ester-type, alkyl amine-type, phosphate ester-type, and hydrophilic or surface active alkyl ether-type compounds. As the conductive substance, conductive carbon black, metal, conductive metallic compounds, or grains having these films can be used.

As disclosed in Japanese Patent Laid-Open Publication Nos. 62-27733, 62-55649, 62-71949, 63-49756, 2-72348, it is desirable to select a filler from among polyvinyl system synthetic resin emulsion, polyolefin system synthetic resin emulsion, synthetic rubber system emulsion, polyamide system synthetic resin emulsion, thermoplastic polyurethane system synthetic resin emulsion, thermoplastic polyester system synthetic resin emulsion, etc. The filler may be formed by mixing more than one emulsion selected from the above.

Although the filler can be used as the adhesive for attaching the light-trapping members 8a and 8b to the shell halves 3a and 3b, the adhesive may be applied after the filler is hardened. As the adhesive, e.g., an acrylic system double-sided adhesive (e.g., NP350B made by Sony Chemicals Corporation), a polyester system dielectric bonding adhesive (e.g., LIOHARD made by Toyo Ink Mfg. Co., Ltd.), a delayed tack-type adhesive (e.g., BPW-5249 made by Toyo Ink Mfg. Co., Ltd.), an alpha syano acrylate system adhesive (e.g., ARON ALPHA 232 made by Toagosei Chemical Industry Co., Ltd.), an acrylic system structural adhesive (e.g., 39X-069 made by Three Bond Co., Ltd.) can be used in place of the filler mentioned above.

When the piles 10b are formed of nylon threads having a round cross section, the thickness of the piles 10b should preferably be 100 denier or less. If the thickness is larger than that, the rigidity of the piles 10b becomes large, which makes it difficult to incline the piles 10b. The length of the piles 10b should be 1 mm or more and less than the width of the ribbon 10. If the width is less than 1 mm, it is difficult to incline the piles 10b. On the other hand, if it is larger than the width of the ribbon 10, it is difficult to handle the ribbon 10. The cross section of the piles 10b may have a flat shape, or any other shape, which is advantageous for the light-trapping ability. Although one pile thread may have any number of filaments, the density of the piles 10b is optimally about 100,000 piles/cm$^2$. If the density is larger than that, the piles 10*b* interfere with each other, which makes it difficult to incline the piles 10*b*.

It is preferable to make the inclination of the piles 10*b* in a range of 30° to 80°, and more preferable to make it in a range 40° to 60° in order to reduce the advancing torque while retaining adequate light-trapping ability.

It is preferable to determine the moisture content of the ribbon 10 to be 50 (w/w)%, or more, prior to imparting inclination to the piles 10*b*. If the moisture content is less than 50 (w/w)%, the piles 10*b* are loosened or spread, which causes the piles 10*b* not to be inclined in the same direction uniformly, resulting in increase of the advancing torque. The moisture content may be a large value, e.g., 300 (w/w)%; however, in such a case, moisture may form on the ribbon 10.

The standard definition of moisture content is utilized herein. In other words, the moisture content is defined as the ratio of the weight of water absorbed in the ribbon with respect to the weight of the ribbon when dry. In particular, moisture content can be defined by the following equation:

$$M = (W2 - W1)/W1 \times 100$$

Where;
W1 is the weight of a ribbon per unit length dried at 105 degrees centigrade for 4 hours,
W2 is the weight of a ribbon per unit length after absorbing moisture, and
M is defined as the moisture content percentage or (w/w)%.

It is preferable to set the twisting angle $\Theta$ of the twister 16 in the range of 60° to 180°. If the twisting angle $\Theta$ is smaller than 60°, the piles 10*b* of the ribbon 10 become approximately perpendicular to the surface of the thermal drum 15, which makes it difficult to incline the piles 10*b* in one direction. On the other hand, if the twisting angle $\Theta$ is larger than 180°, the right and back surfaces of the ribbon 10 are reversed, so that the piles 10*b* will not be in contact with the thermal drum 15, making it impossible to impart inclination to the piles 10*b*.

Several examples and comparative examples will be discussed below to explain the present invention in greater detail.

EXAMPLE 1

A pile fabric was woven as follows:
warp thread: static nylon PAREL thread having 50 denier/30 filaments made by Toray Industries, Inc.
weft thread: static nylon PAREL thread having 70 denier/24 filaments made by Toray Industries, Inc.
pile thread: PROMILAN T 8100 thread nylon (trade name) having 100 denier/48 filaments made by Toray Industries, Inc.
  width of the fabric: 5.0 mm
  width of pile planted portion: 3.5 mm
  warp inlaying density: 90 threads/inch
  weft inlaying density: 120 threads/inch
  weave: plain weave, pile inlaid in the V-shape
  pile density: 58,000 piles/cm$^2$ The woven pile fabric was sheared by a shearing machine to be 2.0 mm in thickness and thereafter dyed black with Mitsui nylon black SGL 6% O.W.F. (trade name) by a wince dying machine to obtain the ribbon 10.

Figure 5:
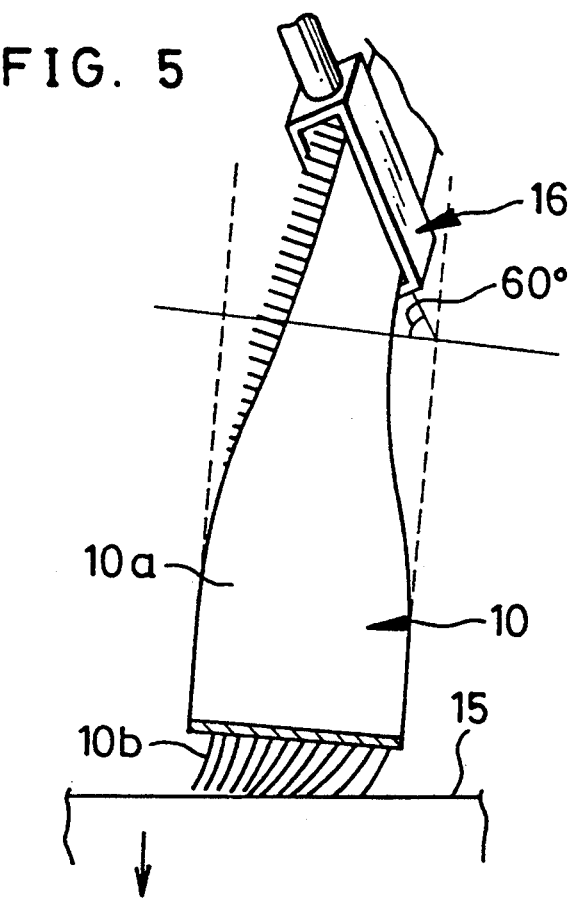
FIGS. 5 to 8 are explanatory diagrams illustrating various twisting angles.

After making sure that the moisture content of the ribbon 10 was 50 (w/w)%, the piles 10*b* were inclined under the following condition, as illustrated in FIG. 5.
  Twisting angle $\Theta$: 60°
  Tension of the ribbon 10 by the tension rollers 22, 23: 500 g
  Temperature of the thermal drums 15, 20: 170° C.

EXAMPLE 2

Figure 6:
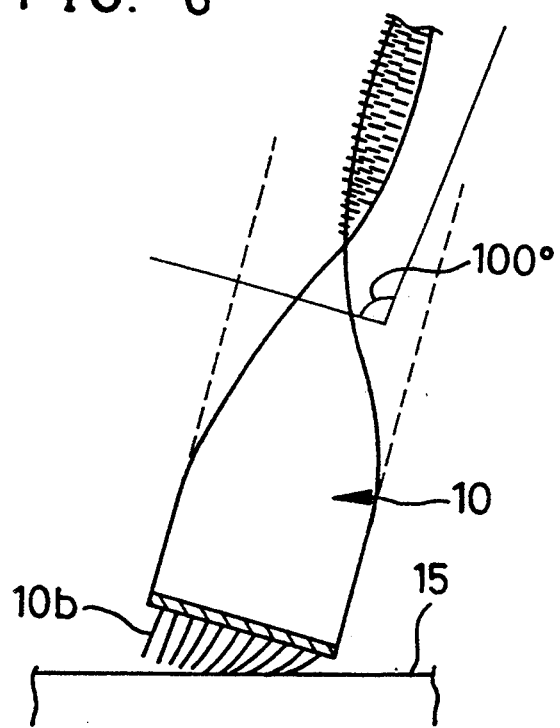

There was used the same ribbon 10 having the moisture content of 50 (w/w)% as in Example 1. As illustrated in FIG. 6, the piles 10*b* of the ribbon 10 were inclined under the following condition:
  Twisting angle $\Theta$: 100°
  Tension of the ribbon 10 by the tension rollers 22, 23: 500 g
  Temperature of the thermal drums 15, 20: 170° C.

EXAMPLE 3

Figure 7:
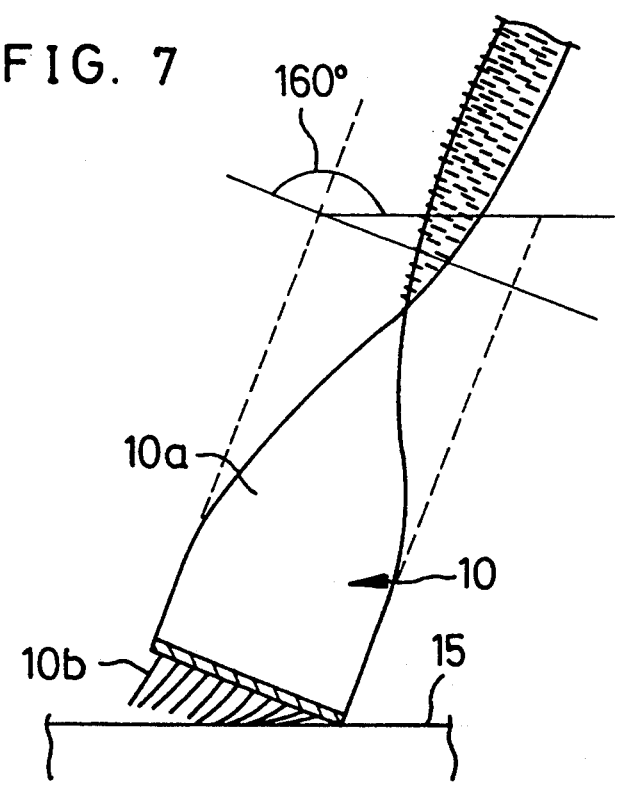

There was used the same ribbon 10 having the moisture content of 50 (w/w)% as in Example 1. As illustrated in FIG. 7, the piles 10*b* were inclined under the following condition:
  Twisting angle $\Theta$: 160°
  Tension of the ribbon 10 by the tension rollers 22, 23: 500 g
  Temperature of the thermal drums 15, 20: 170° C.

EXAMPLE 4

There was used the same ribbon 10 as in Example 1, but having the moisture content of 100 (w/w)%. As illustrated in FIG. 6, the piles 10*b* were inclined under the following condition:
  Twisting angle $\Theta$: 100°
  Tension of the ribbon 10 by the tension rollers 22, 23: 500 g
  Temperature of the thermal drums 15, 20: 170° C.

EXAMPLE 5

There was used the same ribbon 10 as in Example 1, but having the moisture content of 200 (w/w)%. As illustrated in FIG. 6, the piles 10*b* were inclined under the following condition:
  Twisting angle $\Theta$: 100°
  Tension of the ribbon 10 by the tension rollers 22, 23: 500 g
  Temperature of the thermal drums 15, 20: 170° C.

COMPARATIVE EXAMPLE 1

Figure 8:
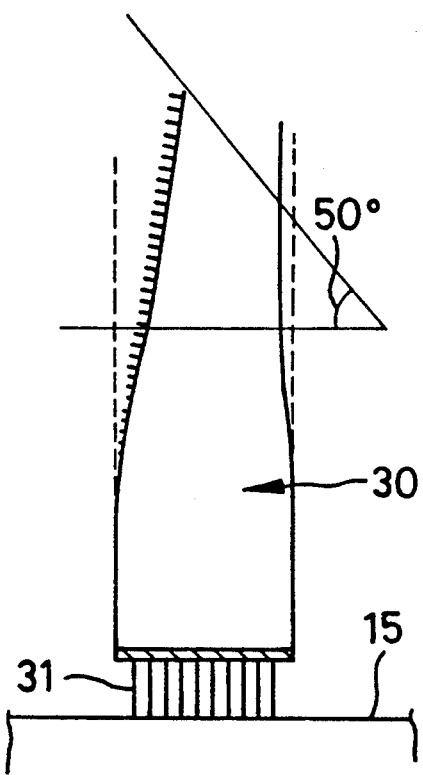

The same fabric as in Example 1 was dyed and then dried to obtain a ribbon 30 having the moisture content of 50 (w/w)%. As illustrated in FIG. 8, piles 31 of the ribbon 30 were inclined under the following condition:
  Twisting angle $\Theta$: 50°
  Tension of the ribbon 30 by the tension rollers 22, 23: 500 g
  Temperature of the thermal drums 15, 20: 170° C.

COMPARATIVE EXAMPLE 2

The same fabric as in Example 1 was dyed and then dried to obtain a ribbon having the moisture content of 40 (w/w)%. Piles of the ribbon were inclined under the following condition:
  Twisting angle $\Theta$: 60°
  Tension of the ribbon by the tension rollers 22, 23: 500 g
  Temperature of the thermal drums 15, 20: 170° C.

COMPARATIVE EXAMPLE 3

The same fabric as in Example 1 was dyed and then dried to obtain a ribbon having the moisture content of 40 (w/w)%. Piles of the ribbon were inclined under the following condition:
Twisting angle Θ: 100°
Tension of the ribbon by the tension rollers 22, 23: 500 g
Temperature of the thermal drums 15, 20: 170° C.

COMPARATIVE EXAMPLE 4

The same fabric as in Example 1 was dyed and then dried to obtain a ribbon having the moisture content of 40 (w/w)%. Piles of the ribbon were inclined under the following condition:
Twisting angle Θ: 160°
Tension of the ribbon by the tension rollers 22, 23: 500 g
Temperature of the thermal drums 15, 20: 170° C.

COMPARATIVE EXAMPLE 5

The same fabric as in Example 1 was dyed and then dried to obtain a ribbon having the moisture content of 30 (w/w)%. Piles of the ribbon were inclined under the following condition:
Twisting angle Θ: 100°
Tension of the ribbon by the tension rollers 22, 23: 500 g
Temperature of the thermal drums 15, 20: 170° C.

Each of the ribbons of Examples 1 to 5 and Comparative Examples 1 to 5 was cut by 40 mm to form light-trapping members which were attached to the upper and lower inside surfaces of the film passage mouths of cassette shell halves by the 0.15 mm thick acrylic system adhesive with the piles directed toward the film advancing direction. The shell halves were mated to obtain ten different photographic film cassettes. Fuji Color Super HG 400 Film (trade name: Fuji Photo Film Co., Ltd.) was contained in the cassette shell. The leading end of the photographic film was cut diagonally at an angle of 60°.

Twenty photographic film cassettes of each kind were subjected to measurement by a torquemeter as to the advancing torques at the time of advancing the leading ends of the photographic films out of the cassette shells. The measured advancing torque was the maximum value at that time in each of the photographic film cassettes. Further, 50 photographic film cassettes for each kind were tested in order to count the number of photographic film cassettes in which the leading end of the photographic film was advanced out of the cassette shell. The number was divided by 50 to obtain the leading end ejection rate. The results of the tests are written in the following Tables 1 and 2.

TABLE 1

| | Examples | | | | |
|---|---|---|---|---|---|
| | 1 | 2 | 3 | 4 | 5 |
| Twisting angle | 60° | 100° | 160° | 100° | 100° |
| Inclination of piles | 72° | 70° | 62° | 67° | 57° |
| Moisture content (w/w %) | 50 | 50 | 50 | 100 | 200 |
| Advancing torque and evaluation | 195 ○ | 183 ◎ | 172 ◎ | 176 ◎ | 165 ◎ |
| Leading end ejection rate (%) and evaluation | 100 ◎ | 100 ◎ | 100 ◎ | 100 ◎ | 100 ◎ |
| Total evaluation | | | usable | | |

TABLE 2

| | Comparative Examples | | | | |
|---|---|---|---|---|---|
| | 1 | 2 | 3 | 4 | 5 |
| Twisting angle | 50° | 60° | 100° | 160° | 100° |
| Inclination of piles | 84° | 85° | 83° | 81° | 87° |
| Moisture content (w/w %) | 50 | 40 | 40 | 40 | 30 |
| Advancing torque and evaluation | 391 X | 405 X | 383 X | 377 X | 452 X |
| Leading end ejection rate (%) and evaluation | 92 X | 90 X | 92 X | 96 X | 86 X |
| Total evaluation | | | usable | | |

Marks and terms used in the Tables represent the following meanings:
Evaluation:
◎ = very good
○ = good
X = bad Twisting angle: The angle at which the ribbon was twisted with respect to its longitudinal direction immediately before contacting the piles within the thermal drum 15.

Inclination of piles: The inclination of 20 piles selected from a line in the width direction of the ribbon.

Moisture content: The weight percentage of the water contained in the ribbon with respect to other components of the ribbon after the dying process and before the inclining process.

Advancing torque: The averaged value of the maximum torques applied to the spools of 20 photographic film cassettes at the time of advancing the leading end out of the cassette shell through the film passage mouth.

Leading end ejection rate: The percentage of the number of photographic film cassettes in which the leading end could be projected out of the film passage mouth with respect to 50 photographic film cassettes.

As is apparent in Table 1, the advancing torques are small and the leading end ejection rates were all 100% according to the light-trapping members of the present invention.

Although the tension applied to portions of the ribbons close to the thermal drums 15 and 20 was 500 g in the above examples and comparative examples, it may be sufficient to utilize a tension of 100 g or slightly more. Also, it can be increased to such an extent that the ribbons will not be torn.

The temperature of the thermal drums 15 and 20 was 170° C., but should be varied, depending on the kind of material used for pile threads. Approximately 150° to 180° is proper for nylon pile threads used above. In this case, at 150° C., the contact time between the ribbon and each thermal drum should be 150 sec. to 1 min.; at 180° C., it should be 10 to 45 sec. Further, approximately 150° to 210° C. is proper for polyester threads. In this case, at 150° C., the contact time should be 30 to 45 sec.; at 210° C., it should be 15 to 30 sec.

Further, the guide roller 14 of FIG. 3 may be dipped in a water bath to add water to the ribbon 10.

While the present invention has been described in detail with reference to a preferred embodiment, various modifications within the scope and spirit of the invention will be apparent to those of working skill in this technological field. Thus, the invention should be considered as limited only by the appended claims.

What is claimed is:

1. A method of making a pair of light-trapping members from a ribbon having a base fabric and piles, said light-trapping members being used for a photographic film cassette having a cassette shell for rotatably containing a spool with a photographic film wound thereon, a leading end of said photographic film being advanced out of said cassette shell through a film passage mouth formed in said cassette shell by rotation of said spool, said light-trapping members being attached to respective upper and lower inside surfaces of said film passage mouth so as to prevent light from entering in the inside of said cassette shell, said method comprising the steps of:

twisting said ribbon relative to a ribbon feeding direction;

contacting said piles of said ribbon with a first thermal drum, which extends transverse to said film feeding direction, so as to incline said piles in a width direction of said ribbon at a predetermined inclination angle; and cutting said ribbon at a predetermined length to obtain said light-trapping members.

2. A method as recited in claim 1, wherein the moisture content of said ribbon is 50 (w/w)% or more.

3. A method as recited in claim 2, wherein a box-shaped twister having a rectangular passage, through which said ribbon is advanced and twisted, is disposed upstream from said first thermal drum, said inclination angle of said piles being varied by changing an angle defined between said passage of said twister and a surface of said first thermal drum which is in contact with said ribbon.

4. A method as recited in claim 3, wherein said twister is inclined, with respect to an axis of said first thermal drum, at an angle of 60° to 180°.

5. A method as recited in claim 3, wherein, in said contacting step, said first thermal drum is rotated so that a peripheral speed of said first thermal drum coincides with a speed for feeding said ribbon so as to incline said piles of said ribbon in said ribbon width direction.

6. A method as recited in claim 3, wherein, in said contacting step, said first thermal drum is rotated so that a peripheral speed of said first thermal drum differs from a speed for feeding said ribbon by a predetermined amount so as to incline said piles of said ribbon in a longitudinal direction of said ribbon.

7. A method as recited in claim 5, further comprising the step of contacting said ribbon with a second thermal drum provided downstream from said first thermal drum to make the inclination of said piles of said ribbon uniform.

8. A method as recited in claim 7, further comprising the step of adjusting the tension of said ribbon with two tension rollers disposed respectively downstream said first and second thermal drums so as to adjust tension of said ribbon to control pressing forces of said ribbon against peripheral surfaces of said first and second drums.

9. A method as recited in claim 8, further comprising raising said piles of said ribbon before the step of contacting said piles of said ribbon with said first thermal drum.

10. A method as recited in claim 9, wherein said raising step is performed by contacting said ribbon with a pair of raising rollers, one of which is rotated in the ribbon feeding direction while the other is rotated in an opposite direction to the ribbon feeding direction.

11. A method as recited in claim 10, wherein the inclination angle of said piles is in a range of 30° to 80°.

12. A method as recited in claim 11, wherein said ribbon is formed of synthetic fibers of thermoplastic resin.

13. A method as recited in claim 12, wherein said piles are 100 denier nylon and have a length of mm or more and less than the width of said ribbon.

14. A method as recited in claim 12, wherein at least one of an anti-static compound and a conductive substance is added to the thermoplastic resin for destaticization.

15. A method as recited in claim 12, wherein said light-trapping members are attached to said film passage mouth by one of adhesive and ultrasonic welding.

16. A method as recited in claim 1, wherein, in said twisting step, said ribbon is at first twisted and then the twist of said ribbon is gradually released while said ribbon is moving in contact with said first thermal drum.

* * * * *